JAMES D. YEAROUT
RICHARD E. TOLBERT
INVENTORS

BY Max Geldin
ATTORNEY

United States Patent Office 3,674,355
Patented July 4, 1972

3,674,355
GAS LUBRICATED BEARING
James D. Yearout, Rolling Hills, and Richard E. Tolbert, Torrance, Calif., assignors to Process Services Inc., Gardena, Calif.
Filed May 28, 1970, Ser. No. 41,270
Int. Cl. F16c 17/10
U.S. Cl. 308—122
15 Claims

ABSTRACT OF THE DISCLOSURE

Gas lubricated bearing system comprising a rotating member having a pair of axially disposed journals formed of surfaces of revolution, e.g. conical journals, and a pair of resiliently supported non-rotating bearings formed of surfaces of revolution, e.g. conical surfaces, in juxtaposed position with respect to said journals, forming a gas receiving zone between said journal and bearing surfaces, and a lubricating gas film in said zone, the resilient support for each of the non-rotating bearings including a radial spring support system reacting against a rigid housing, means for hysteresis damping of the bearing system, e.g. elastomeric seal means between the bearings and rigid housing, and an axial spring support system reacting against the pair of non-rotating bearings, and permitting force interaction between the bearings, providing a rapidly responsive highly stable damping system.

---

This invention relates to bearings for rotating members, e.g. shafts, and is particularly concerned with gas lubricated bearings, that is, bearings designed to be lubricated by a thin film of a gas such as air, helium or other gas.

In various fields of application, for example in cryogenic environments, it is not feasible to lubricate a rotary member by conventional lubricants. Thus, under cryogenic conditions, ordinary liquid lubricants such as petroleum lubricants or silicones become extremely viscous. High temperature operations preclude use of conventional lubricants due to vaporization and thinning problems. Also, in chemically active environments wherein the lubricant will deleteriously react with a chemical in such environment such as gas, e.g. oxygen, lubricating problems arise.

Recently, gas lubricated bearings have been developed to avoid the use of liquid or solid lubricants. In this new technology, lubrication is achieved by maintaining a thin film of gas in a space between a shaft journal and the bearing. The result has been to afford bearings which can be employed in special applications such as those noted above. Further, since there is no physical contact between the solid parts there is no bearing wear as result of operation of such a system. Thus, a suitably designed gas lubricated bearing can be operated at very high speeds over a long period of life.

Various devices and mechanisms have been developed for the resilient mounting of gas lubricated bearings. One of the most common methods employed has been suspension of the bearing by a system of radial and axial springs. In addition, various means for damping vibrations have been employed. An example of such a system is that described and shown in Schwartzman, U.S. Pat. No. 3,249,390. In this patent, oscillatory motion of the floating, non-rotating bearing is damped by "coulomb" friction between various members, including a shoulder member on the bearing, in rubbing contact with adjacent parts of the frame member. However, the damping of the oscillatory motion of the bearings by coulomb friction for preventing metal to metal contact between the shaft journals and bearing, as described in the above patent, has certain undesirable characteristics. In the first place, the static co-efficient of friction is greater than the kinetic, resulting in a larger force requirement to initiate movement of the bearing than to sustain it. Further, friction force generated once motion is established, is relatively independent of the velocity of the contacting or rubbing parts. Preferably, the damping force should be proportional to both frequency and amplitude of vibration.

The above noted undesirable characteristics of coulomb damping of the gas lubricated bearing described in the above noted Schwartzman patent, are obviated, according to the present invention by utilizing the phenomenon of hysteresis damping of the non-rotating bearing instead of coulomb damping. This is accompilshed in the system of the present invention by providing resilient, preferably elastomeric, e.g. rubber, sealing means on which the non-rotating bearing is supported in combination with a novel axial spring system. The axial springs are positioned between the axially disposed bearings so that axial motion on one bearing is transmitted by the spring system to the other bearing, whereas in the system of the above noted Schwartzman patent the axial bearings provided therein operate independently against a rigid housing so that axial motion of one bearing is not imparted to the other. Thus, the axial spring system provided in the device of the present invention affords dependent operation of the pair of bearings whereas in the device of the above patent, free interaction between the two bearings is not permitted in the axial direction, and such bearings operate independently in the axial direction.

The axial force coupling between the bearings provided by the spring system according to the present invention, is particularly effective in the control of a disturbing force vector which rotates at some frequency about the rotational axis of the system, and having a particularly troublesome form of disturbance is commonly encountered in crygenic machinery as a result of water, carbon dioxide, or other contamination, freezing out on a turbine wheel and producing an unbalanced rotating member. It is also encountered in equipment which must be moved while operating, with the unbalanced force being produced by gyroscopic effects, and by acceleration and deceleration, e.g. due to changing process operating conditions. Without such axial force coupling which is characteristic of the above Schwartzman Patent No. 3,249,390, this type of disturbance results in failure of the bearing opposite the location of the applied force.

In addition, in the system of the present invention preferably employing four radial springs or multiples thereof for radially supporting the respective bearings, upon radial oscillatory motion of the bearing, the restoring force is essentially constant regardless of the angular position of the force, whereas in the device of the above patent employing three radial springs for supporting the respective bearings, the restoring force is not constant, often resulting in erratic and unbalanced operation.

Thus, the system of the present invention, particularly employing hysteresis damping as opposed to coulomb damping, to stabilize the oscillatory motion of the bearings upon the imposition of a non-axial or concentric force applied to the rotating shaft and journals thereon, together with the other features of the invention noted above, provides a rapidly reacting and much more stable damping system as compared to that of the above patent, particularly for preventing metal to metal contact between the rotating and bearing members of the system.

Thus, according to the invention, a gas lubricated bearing is provided, comprising a stationary frame member containing a bore having a longitudinal axis, a rotatable member disposed axially within said bore, a pair of journals mounted on said rotatable member and spared axially from each other, said journals each having a surface of revolution formed about said axis, a pair of outer substantially non-rotating bearings respectively positioned around said journals, each of said bearings having an internal surface of revolution of the adjacent juxtaposed journal and forming a space defining a region for a lubricating gas film, whereby said rotatable member is radially force-coupled to said bearings, resilient means for supporting each of said bearings in said frame member, said resilient support means including means providing hysteresis damping for damping oscillatory motion of said bearings with respect to said frame member, and axially disposed spring means positioned between and force coupled to said bearings, whereby a force applied to one of said bearings is transmitted by said axially disposed spring means to said other bearing.

The invention will be more clearly understood from the description below of a preferred embodiment, taken in connection with the accompanying drawings wherein.

Figure 1:
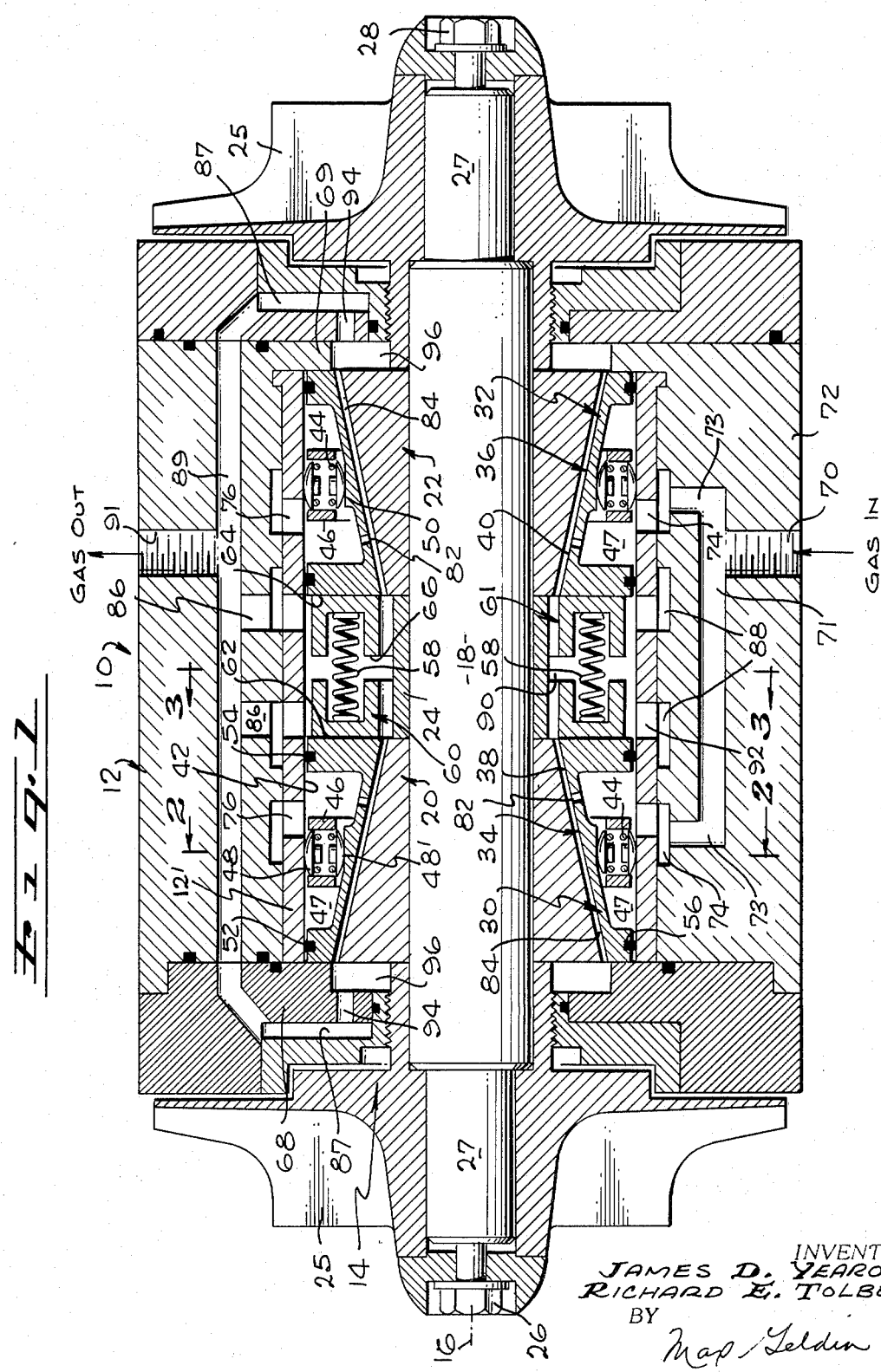
FIG. 1 is a longitudinal sectional view of a gas lubricated bearing constructed in accordance with the invention principles.

Referring to FIG. 1 of the drawing, illustrating one form of the invention, although it is understood that the invention is not to be taken as limited by such example, a gas lubricated bearing system 10 is illustrated, including an outer housing 12 which is fixed and which has a central opening 14 concentric about a system axis 16. The opening 14 receives a rotatable shaft 18 on which are mounted a forward conical journal 20 and an axially oppositely disposed rear conical journal 22, and a cylindrical center portion 24. The shaft carries turbine wheels 25 mounted in opposite end positions 27 of the shaft. Shaft 18 and members 20, 22, 24 and 25 thereon are held in position between the nuts 26 and 28.

The conical surfaces of the journals 20 and 22 in the embodiment shwon are divergent from the axis 16 in opposite directions from each other, the angle of divergence of the conical surfaces of both journals 20 and 22 being the same in the embodiment shown, although it will be understood that the angle of divergence of the conical surfaces of such journals can be different, and if desired, the surfaces of both journals can be made divergent in the same direction.

Mounted within the housing or frame member 12 are a pair of non-rotating bearings 30 and 32 having a central opening 34 and 36 therein which is in the form of a surface of revolution disposed about the system axis 16, and in each case includes a conical bearing surface 38 or 40, each of which is formed with an angle of divergence from the system axis 16 which is equal to that of the conical surface of the adjacent juxtaposed conical journal 20 or 22, and which is disposed with respect to the latter surfaces so as to provide an angular space defining a region for a thin lubricating gas film. The oppositely divergent angles of the conical bearing surfaces 38 and 40 are also the same.

Figure 2:
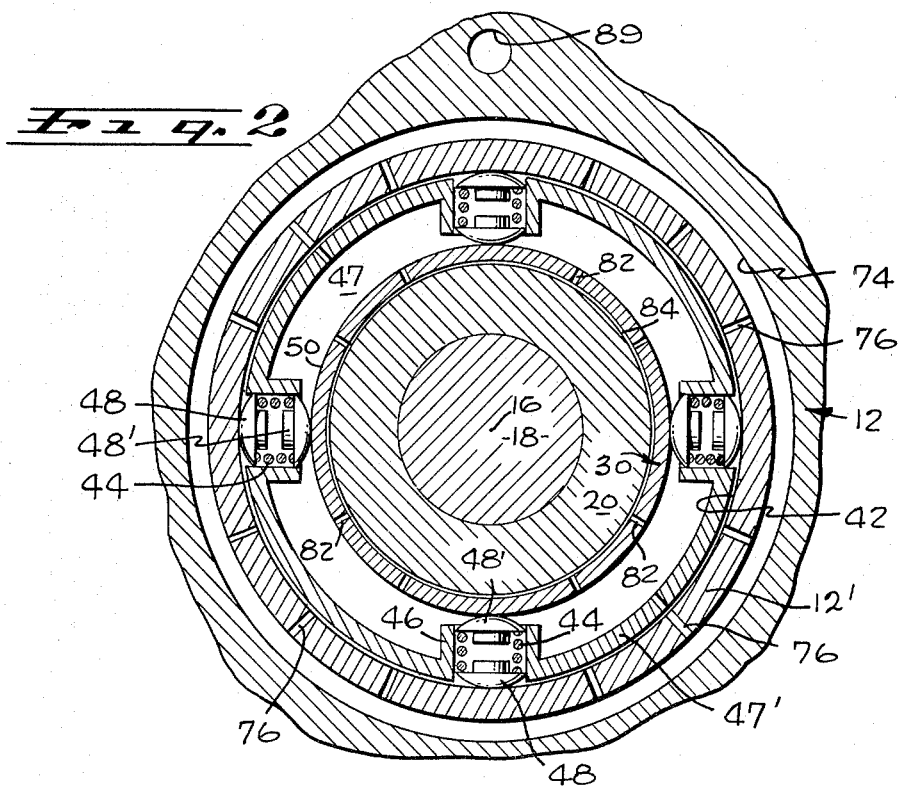
FIG. 2 is a cross-sectional view of the device of FIG. 1, taken on line 2—2 of FIG. 1.

The non-rotating bearings 30 and 32 are positioned within a cylindrical bore 42 of frame member 12, the bore 42 being concentric with the axis 16 of the system. Each of the bearings 30 and 32 is supported within the bore 42 by four radially disposed metal springs 44 (see also FIG. 2) each disposed in a spring cage 46 with spring caps 48 and 48' positioned at opposite ends of each spring. The spring cages 46 are mounted in a split ring 47' disposed axially within cavity 47 formed within each of bearings 30 and 32. Spring cages 46 and the springs 44 disposed therein are mounted at substantially equal angles of 90° around the axis 16 to form an orthogonal spring arrangement. One of the spring caps 48 is in compressive contact with an inner frame liner 12' within the housing, and the other or inner spring cap 48' is in compressive contact with the surface of a shoulder 50 provided on the inner surface of the conical wall of each of the bearings 30 and 32. Additional resilient support for each of the oscillatory bearings 30 and 32 is provided by a pair of resilient elastomeric, e.g. rubber, O-ring seals 52 and 54 received in slots 56 adjacent the outer surfaces of each of the bearings at opposite ends thereof, the seals 52 and 54 being in compressive contact with the frame liner 12' of frame 12. The elastomeric seals 52 and 54 can be formed of any suitable resilient material which can be a rubber or plastic material such as Viton, neoprene, silicone rubber, Teflon, and the like depending upon temperature and composition of the gas lubricant.

Figure 3:
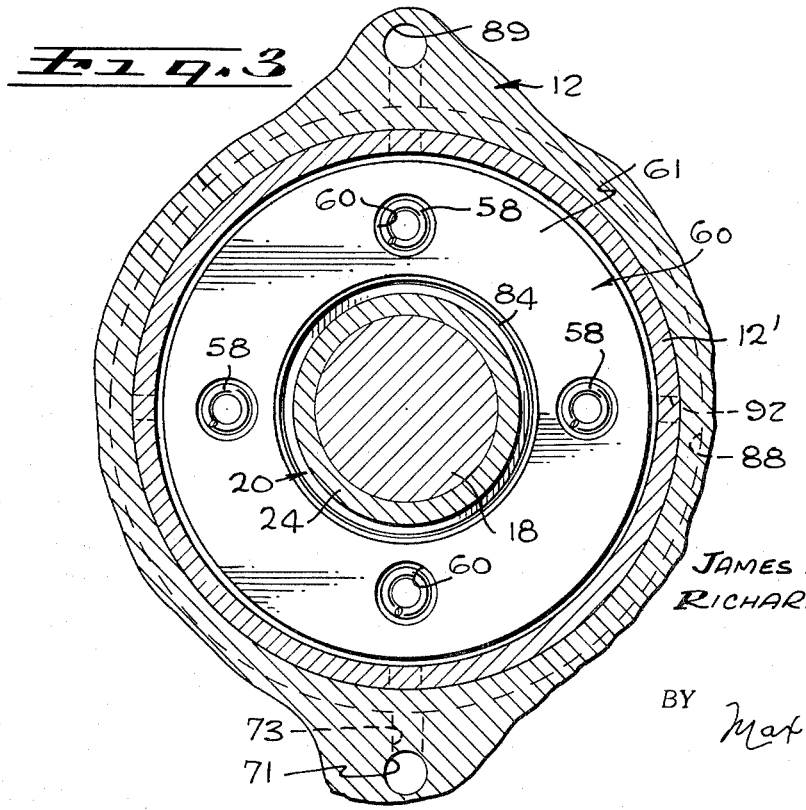
FIG. 3 is a cross sectional view taken on line 3—3 of FIG. 1.

The resilient support system in accordance with another feature of the present invention includes a plurality, here shown as four in number, of axially disposed springs 58 (see also FIG. 3), mounted at substantially equal angles of 90° around the axis 16, and each positioned in a spring retainer housing 60 in the form of a pair of circular cavities in a pair of oppositely disposed spaced annular plates 61 which are respectively in contact with the inner ends 62 and 64 of the opposite axially disposed bearings 30 and 32, respectively. Four such circular cavities 60 are formed in each of the plates 61 spaced at 90° angles around the periphery of each plate 61, the cavities in each of such plates being in axial alignment as seen in FIG. 1 to form the retainer housing 60 for each of springs 58. The opposite ends of each of springs 58 are in compressive contact with the opposite plates 61, and such outer compressive force is transmitted against inner end 62 of bearing 30 and inner end 64 of the opposite axially disposed bearing 32, and maintaining plates 61 in position against such bearings. It will be seen that in this arrangement axial motion imparted to one of the non-rotatable bearings 30 or 32, is transmitted by the spring system comprising axial springs 58, to the other bearing. As in the case of the radial springs 44, four of such axial springs 58 or a multiple of four thereof are employed to provide an orthogonal arrangement.

The inner ends 66 of each of the oppositely disposed plates 61 forming the spring retainer housings 60 for the axial springs 58, form stops limiting axial movement of bearings 30 and 32 towards each other, and stops 68 and 69 are provided at opposite ends of the frame 12, to prevent outward overtravel of the bearing system.

A gas feed inlet 70 is provided in the outer housing 72 of frame 12, and communicates via a conduit 71 with an inlet port 73 adjacent each of the bearings 30 and 32, ports 73 each being in communication with an annular channel or groove 74 (see FIG. 2) in the housing, which groove 74 in turn communicates with a plurality of gas feed holes or ports 76 disposed peripherally through liner 12' of the housing, adjacent each of the resiliently supported bearings 30 and 32. Holes 76 communicate with the bearing cavity 47 formed within each of bearings 30 and 32, which in turn communicate via gas feed holes 82 peripherally disposed around each of bearings 30 and 32, with the gas film space or region 84 formed between the outer juxtaposed adjacent conical surfaces of the journal 20 and the bearing 30, and of the journal 22 and bearing 32. The elastomeric O-ring seals 52 and 54 at opposite ends of each of the bearings, seal off the gas film space 84, and prevent leakage of bearing gas.

Gas is removed from film space 84 between each bearing and its adjacent conical journal through conduits 86 and 87 adjacent opposite ends of each of the bearings 30 and 32, which discharge into conduit 89 which in turn communicates with gas discharge outlet 91. Conduit 86 is in communication with another annular groove 88 in outer housing 12, similar to grooves 74 but spaced axially inward from grooves 74 within the housing, groove 88 being in communication with a central collection chamber 90 between the two bearings 30 and 32, via a plurality of holes 92 disposed peripherally through liner 12' of the housing, and collection chamber 90 being in communication with the inner end of the film space 84 adjacent each of the bearings. Conduits 87, one adjacent the outer end of each of the bearings 30 and 32, are each in communication via a channel 94 with a collection chamber 96 adjacent the outer end of each of the bearings, collection chamber 96 at each end of the bearings each being in communication with the outer end of film space 84 adjacent each of the bearings.

In operation of the above described lubricated gas bearing, functioning as a hydrostatic type bearing, gas under a predetermined pressure is continuously supplied via the gas feed inlet 70 and the bearing cavities 47 to the gas film region 84, the space between the rotating journals and the non-rotating bearings, to maintain the thin gas film at the interface between these rotating and non-rotating members, and confined by the O-ring seals 52 and 54. The shaft 18 with journals 20 and 22 thereon rotates on the gas film in the gas film region 84 which is maintained by the resiliently supported bearings 30 and 32, whereby the shaft is radially force coupled to the bearings. The conical bearing surfaces thus support both radial and axial forces which may be applied to the shaft. Upon the application of an unbalanced or concentric force upon the rotating shaft and journals, causing axial or radial motion of the journals, and a change in the dimensions of the gas film, an unbalanced gas pressure will be developed in the film cavity 84, forcing the two journals to react against the spring system provided by the radial springs 44 and by the axial springs 58. The shaft and journals thereon will tend to move, and as result of the force coupling provided between the journals 20 and 22, and bearings 30 and 32, the bearings will assume a new axial position by compressing the springs 58 of the axial spring system. If the axial spring system is not free to react directly upon the adjacent bearings, the system would not react with sufficient speed. Rapid reaction and stabilization of axial forces is achieved by the invention system particularly by virtue of transmission of axial motion directly from one bearing 30 or 32, to the other bearing via the axial springs 58.

In combination with such axial spring system, the invention system described above provides hysteresis damping by provision of the resilient, e.g. rubber, seals 52 and 54 on which each of the bearings is mounted, together with the provision of the radial supporting springs 44. The provision of such hysteresis damping affords a much more stable damping system than does the coulomb friction damping mechanism of the above noted Schwartzman patent. Further, it is noted that the provision of the four equally spaced radial springs 44, or multiples thereof, for support of the bearings provides a substantially constant restoring force regardless of the angular position of the force.

The pressure of the lubricating gas feed applied at feed inlet 70 depends on the process working conditions. Thus, for example where the bearing system of the invention is employed for operation of a turbine where air is the process fluid and is also the gas lubricant for the bearing, the pressure of the air feed at 70 can be for example, 100 p.s.i.a. and the air is discharged from outlet 91 at about ambient pressure. In another such arrangement where the process fluid is methane, the methane feed at 70 can be, for example at 150 p.s.i.a. and the discharge pressure at 91 is about 35 p.s.i.a. The number and size of the gas feed holes in the bearings 30 and 32 can be adjusted to the particular working pressure of the process fluid used as gas lubricating medium.

If the temperature of operation is close to ambient temperature, then the radial springs 44 can be eliminated and only the seals 52 and 54 are used for efficient elastic support of the bearings. It will be understood that in certain instances or environments where elastomers are not satisfactory or compatible, combinations of various types of metals may be used. The required elastomeric materials for the seals 52 and 54 can be chosen to obtain the proper combination of resilience and damping.

Although the surfaces of revolution of the rotating journals and juxtaposed resiliently supported bearings are shown as being conical, it will be understood that such surfaces of revolution can be for example hyperbolic, cylindrical, spherical or any other suitable surface of revolution.

Although the gas lubricated bearing device of the invention described above has been described as being of the hydrostatic type, it can also be operated hydrodynamically, that is by providing a gas film which is self maintaining within the gas film region 84, where sufficiently high relative tangential velocities, e.g. 50 feet per second and greater are reached.

It is accordingly seen that the invention system provides a novel gas lubricated bearing which operates on the principle of hysteresis damping, with the resulting advantage of greater stability and rapidity of response to axial and radial loads, to provide a more stable system avoiding metal to metal contact and potential damage to shaft and bearings.

While we have described particular embodiments of our invention for purposes of illustration, it will be understood that variations and modifications of the invention will occur to those skilled in the art, and the invention is not to be taken as limited except by the scope of the appended claims.

We claim:

1. A gas lubricated bearing comprising a stationary frame member containing a bore having a longitudinal axis, a rotatable member disposed axially within said bore, a pair of journals mounted on said rotatable member and spaced axially from each other, said journals each having a surface of revolution formed about said axis, a pair of outer substantially non-rotating bearings respectively positioned around said journals, each of said bearings having an internal surface of revolution corresponding to the surface of revolution of the adjacent juxtaposed journal, and forming a space defining a region for a lubricating gas film, whereby said rotatable member is radially force-coupled to said bearings, resilient means for supporting each of said bearings in said frame member, said resilient support means including means providing hysteresis damping for damping oscillatory motion of said bearings with respect to said frame member, and axially disposed spring means positioned between and force coupled to said bearings, whereby a force applied to one of said bearings is transmitted by said axially disposed spring means to said other bearing.

2. A gas lubricated bearing system as defined in claim 1, said means providing hysteresis damping comprising resilient elastomeric sealing means.

3. A gas lubricated bearing system as defined in claim 2, said resilient elastomeric sealing means comprising at least a pair of resilient elastomeric seals mounted adjacent the outer surfaces and at opposite ends of each of said bearings, said seals being in compressive contact with said frame member.

4. A gas lubricated bearing system as defined in claim 3, said resilient elastomeric seals each comprising a rubber O-ring seal, and including a pair of slots disposed adjacent the outer surface at opposite ends of each of said bearings, said O-ring seals being received in said respective slots.

5. A gas lubricated bearing system as defined in claim 1, said resilient support means for supporting each of said bearings comprising four radially disposed springs or a multiple thereof positioned at substantially equal angles around said longitudinal axis, between each of said bearings and said frame member, and in compressive contact with said frame member.

6. A gas lubricated bearing system as defined in claim 4, said resilient support means for supporting each of said bearings comprising four radially disposed springs or a multiple thereof positioned at substantially equal angles around said longitudinal axis, between each of said bearings and said frame member, and in compressive contact with said frame member.

7. A gas lubricated bearing system as defined in claim 1, said axially disposed spring means comprising a plurality of axially disposed springs.

8. A gas lubricated bearing system as defined in claim 4, said axially disposed spring means comprising a plurality of axially disposed springs.

9. A gas lubricated bearing system as defined in claim 6, said axially disposed spring means comprising four axially disposed springs or a multiple thereof positioned at substantially equal angles around said longitudinal axis.

10. A gas lubricated bearing system as defined in claim 1, including means for supplying a lubricating gas hydrostatically to said gas film region, lubricating gas in said region, and means for discharging said gas from said region under conditions to maintain said lubricating gas film in said gas film region.

11. A gas lubricating bearing system as defined in claim 9, including means for supplying a lubricating gas under pressure hydrostatically to said gas film region, lubricating gas in said region, and means for discharging said gas from said region under conditions to maintain said lubricating gas film in said gas film region.

12. A gas lubricated bearing system as defined in claim 1, said surface of revolution of each of said journals being substantially conical surfaces, said conical surfaces of said journals being divergent from said axis in opposite directions from each other, the angle of divergence of the surfaces of both said journals being substantially the same, said internal surface of revolution of each of said bearings being substantially conical and said last mentioned conical surfaces diverging in opposite directons from each other with substantially the same angle of divergence.

13. A gas lubricated bearing system as defined in claim 11, said surface of revolution of each of said journals being substantially conical surfaces, said conical surfaces of said journals being divergent from said axis in opposite directions from each other, the angle of divergence of the surfaces of both said journals being substantially the same, said internals surface of revolution of each of said bearings being substantially conical and said last mentioned conical surfaces diverging in opposite directions from each other with substantially the same angle of divergence.

14. A gas lubricated bearing as defined in claim 10, said means for supplying said lubricating gas to said gas film region adjacent each of said bearings including a gas feed conduit, an annular chamber in said frame member, said gas feed conduit communicating with said chamber, a cavity in each of said bearings, a plurality of peripherally disposed holes in said frame member communicating said annular chamber with said bearing cavity, a plurality of gas feed holes disposed peripherally around and through said bearing and communicating said bearing cavity with said gas film region, and said means for discharging said gas from said gas film region including a gas collection chamber adjacent opposite ends of each of said bearings, a discharge conduit, and channel means communicating each of said gas collection chambers with said discharge conduit.

15. A gas lubricating bearing as defined in claim 13, said means for supplying said lubricating gas to said gas film region adjacent each of said bearings including a gas feed conduit, an annular chamber in said frame member, said gas feed conduit communicating with said chamber, a cavity in each of said bearings, a plurality of peripherally disposed holes in said frame member communicating said annular chamber with said bearing cavity, a plurality of gas feed holes disposed peripherally around and through said bearing and communicating said bearing cavity with said gas film region, and said means for discharging said gas from said gas film region including a gas collection chamber adjacent opposite ends of each of said bearings, a discharge conduit, and channel means communicating each of said gas collection chambers with said discharge conduit.

References Cited

UNITED STATES PATENTS 3,249,390   5/1966   Schwartzman _____ 308—122

MARTIN P. SCHWADRON, Primary Examiner

F. SUSKO, Assistant Examiner